Oct. 2, 1945.  H. J. LE VESCONTE  2,385,821
STAMPED LOCK NUT
Filed Dec. 26, 1944
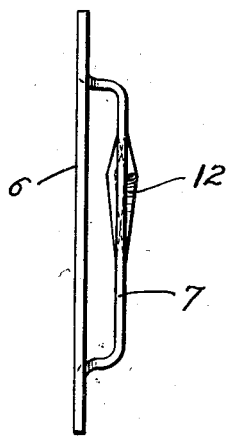
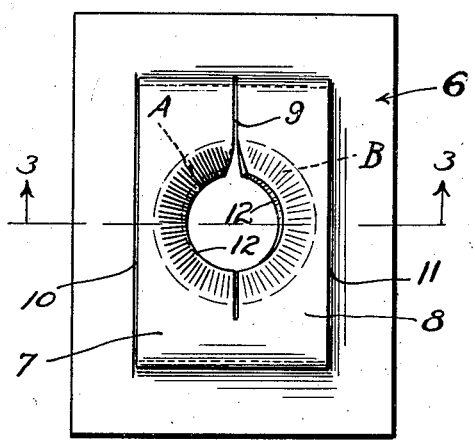
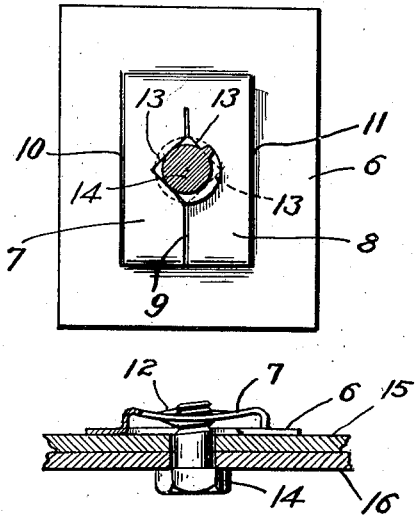
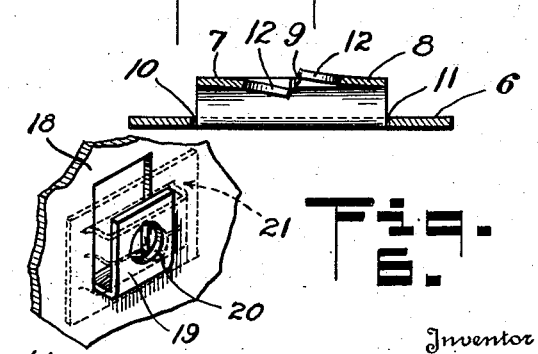
Inventor
HAROLD J. LE VESCONTE
By R. L. Burnt
Attorney Patented Oct. 2, 1945

2,385,821

UNITED STATES PATENT OFFICE 2,385,821

STAMPED LOCK NUT

Harold J. Le Vesconte, Glendale, Calif., assignor to Adel Precision Products Corp., a corporation of California Application December 26, 1944, Serial No. 569,866

6 Claims. (Cl. 85—36)

This invention relates to stamped sheet metal nuts for threadedly engaging bolts, screws and the like and more particularly pertains to nuts of this type wherein a plate-like sheet metal body is formed with resilient portions which are outwardly offset from the body and provided with complementary opposed edge portions constructed and arranged for threadedly and yieldingly engaging a bolt, screw or like fastening so as to "lock" the fastening and nut in place.

Heretofore in this art, particularly in sheet metal nuts in which the outwardly offset bolt-engaging resilient portions of the nut are arranged in side by side relation either as tongues integral with the plate-like nut body at one end only or more especially as bridges or arches integral with the body at both ends, each offset portion in entirety, or substantially in entirety, is inclined in opposite directions and one of them outwardly offset substantially in entirety a greater extent that the other to dispose the thread-engaging edges thereof at the proper pitch for threaded engagement with a bolt, screw or the like.

The primary object of the present invention is to provide a resilient self-locking sheet metal nut of the character described in which opposite inclination and relative offsetting of all, or substantially all, of the two side by side bolt-gripping portions such as heretofore required are eliminated except for a simple distortion of but a small area of each bolt-engaging portion at a point contiguous the bolt-engaging edge thereof, thereby reducing the cost of manufacturing the nut as well as the cost of die stamping equipment, and at the same time providing a formation which may be readily engaged by the ordinary wrench for tightening the nut, also adding strength and rigidity and affording such a resilient action that said bolt-engaging edges will effectively lock the bolt and nut against loosening.

Another object is to provide a sheet metal nut which is especially designed for installations where more than the usual amount of yielding action is desired.

Another object is to provide a nut such as described which provides between the body thereof and the bridge members a space through which a member may be inserted for supporting the nut or in order to be supported by the nut, with provision for clamping the nut against said member when the bridge portions are bowed inwardly upon tightening the nut.

Another object of this invention is to provide a nut such as described in which the outwardly offset portions are of substantially equal outward extent and length and substantially parallel to one another and to the resilient plate-like base or body of the nut except for relatively small areas immediately adjacent the opposed edge portions which form a bolt-receiving opening through the nut, only these small areas being distorted so that said edge portions are disposed at the proper helix angle to threadedly engage the nut under a like yielding action of the two uniformly dimensioned and uniformly outwardly offset portions which latter are bowed inwardly upon tightening the nut and bolt so as to urge the edge portions into locking engagement with the bolt.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a top plan view of the nut;

Fig. 2 is a side elevation of a nut embodying the present invention;

Fig. 3 is a cross sectional view taken on the line 3—3 of Fig. 1;

Fig. 4 is a top plan view of a modified form of nut as when applied to a bolt which latter is shown in cross section, to illustrate how the nut and bolt are threadedly engaged with one another;

Fig. 5 is a side elevational-part sectional view of the nut (either form) as when applied to hold the parts together, showing how portions of the nut are bowed inwardly when the bolt and nut are tightened;

Fig. 6 is a fragmentary perspective view showing a particular application of the nut, the nut being shown in dotted lines.

It will be seen with reference to the accompanying drawing that a nut embodying the present invention is made of plate-like resilient sheet metal body or base 6 from between the margins of which two elongated bridge portions 7 and 8 are struck or stamped so as to lie side by side for the most part in substantially parallel relation to one another and the body. These bridge portions have substantially an equal length and outward extent, there being a slit or cut 9 separating said portions along their adjacent side edges, and other slits or cuts 10 and 11 separating the outer side edges of said members from the body 6. The opposed side edges of the bridge portions 7 and 8 at points intermediate the ends thereof are notched to provide arcuate edge portions 12 as shown in Figs. 1, 2 and 3 forming a bolt-receiving opening. In Fig. 4 these notches are such as to form angularly related bolt-engaging edge portions 13 defining a "square" bolt hole, thus illustrating that the bolt-engaging edge portions may be variously shaped as within the purview of the invention.

As shown in Fig. 1 the bridge portions 7 and 8 are twisted or distorted only at the small areas thereof which are arcuately contiguous to the edge portions 12 so that the latter have a substantially helical disposition, or in other words, are pitched to have threaded engagement with the threads of a bolt or screw such as the bolt 14 shown in Fig. 5. These distorted areas are designated A and B in Fig. 1 which best illustrates the scope of such areas and shows that the major portions of the bridge portions 7 and 8 are planar and of equal height and outward extent as well as length and width.

As shown in Fig. 5 the bolt 14 is inserted through members 15 and 16 which are to be secured together when the bolt and nut are tightened. The two arch or bridge portions 7 and 8 will bow inwardly when the nut and bolt are tight and therefore cause the helically pitched edge portions 12 (or 13) to have a resilient wedging and locking action with the threads of the bolt thereby securely holding the bolt and nut against unintentional loosening.

It should be noted that a nut made in accordance with my invention can be manufactured with greater ease and at lower cost due to the uniformly struck out bridge portions and the distortion of but a small part of each bridge portion. Moreover, the particular formation of my nut lends desired rigidity and strength while assuring that the bridge portions will afford a pronounced and uniformly applied spring action, so that as the nut and bolt are tightened the helically pitched edges 12 will be yieldingly wedged against the threads of the bolt, the bridge portions being somewhat twisted as they are bowed inwardly to enhance this wedging action. Furthermore, the equally offset bridge portions give to the nut a shape making it possible to effectively use a wrench for tightening the nut.

There is provided considerable space as will be apparent in Fig. 2, between the body 6 and the bridge portions 7 and 8. This space will accommodate an element which is to be supported or which is adapted to support the nut. As shown in Fig. 6 if a panel such as the one 18 is formed with an outwardly struck hook 19 having an opening 20 therein, a hook made in accordance with my invention and here designated 21 and shown in dotted lines may be held in place by the hook when the latter is inserted through the space between the bridge portions and the body. With the nut thus supported on panel 18 said panel may be secured to another member in the same manner as members 15 and 16 and secured together without requiring that the operator hold the nut in place. The opening 20 registers with the opening through the nut and the opening through the panel formed in striking out the hook, opening 20 being large enough to allow the distorted areas around edges 12 to be depressed or forced inwardly. The bridge portions are free to yield as there is provided sufficient space between the hook 19 and the body 6 and bridge portions 7 and 8 to accommodate the yielding of the bridge portions.

Upon the tightening of the nut arranged as shown in Fig. 6, the member (hook 19) between the body 6 and the bridge portions will be clamped and held thereby when the bridge portions are bowed inwardly.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a nut, a plate-like sheet metal body, elongated resilient portions integral with said body and disposed in side by side relation to one another and in substantially equally outwardly offset relation to said body, and complementary edge portions formed between the ends of the adjacent side edges of said resilient portions so as to define an opening for a screw threaded fastening, said complementary edge portions and only the relatively small areas of said resilient portions contiguous said edge portions being distorted to angularly dispose said edge portions for a screw threaded engagement with a screw threaded fastening turned in said opening.

2. In a nut, a plate-like sheet metal body, elongated resilient portions integral with said body and disposed in side by side relation to one another and in substantially equally outwardly offset relation to said body, and complementary edge portions formed between the ends of the adjacent side edges of said resilient portions so as to define an opening for a screw threaded fastening, said complementary edge portions and only the relatively small areas of said resilient portions contiguous said edge portions being distorted to angularly disposed said edge portions for a screw threaded engagement with a screw threaded fastening turned in said opening, said elongated resilient portions being disposed for the most part in substantially the same plane and located in inwardly spaced relation to the margins of said body.

3. In a stamped sheet metal nut, a body and resilient bridge portions disposed side by side with their ends in integral formation with said body, said bridge portions being for the most part of equally outwardly offset relation to the plane of the body and having notched side edges defining edge portions adapted to threadedly engage a screw threaded fastening turned therebetween, said edge portions and only relatively small areas of the bridge portions contiguous said edge portions being oppositely inclined and relatively positioned so that said edge portions will threadedly engage said fastening.

4. In a nut, a plate-like sheet metal body, elongated resilient portions integral with said body and disposed in side by side relation to one another and in substantially equally outwardly offset relation to said body, and complementary edge portions formed between the ends of the adjacent side edges of said resilient portions so as to define an opening for a screw threaded fastening, said complementary edge portions and only the relatively small areas of said resilient portions contiguous said edge portions being oppositely inclined and disposed so that said edge portions are helically pitched for threaded engagement with said screw threaded fastening.

5. In a stamped sheet metal nut, a body and resilient bridge portions disposed side by side with their ends in integral formation with said body, said bridge portions being for the most part of equally outwardly offset relation to the plane of the body and having notched side edges defining edge portions adapted to threadedly engage a screw threaded fastening turned therebetween, said edge portions and only relatively small areas of the bridge portions contiguius said edge portions being oppositely inclined and relatively positioned so that said edge portions will threadedly engage said fastening, said bridge portions being subject in entirety to being bowed inwardly upon the tightening of the nut.

6. In a stamped sheet metal nut, a body and resilient bridge portions disposed side by side with their ends in integral formation with said body, said bridge portions being for the most part of equally outwardly offset relation to the plane of the body and having notched side edges defining edge portions adapted to threadedly engage a screw threaded fastening turned therebetween, said edge portions and only relatively small areas of the bridge portions contiguous said edge portions being oppositely inclined and relatively positioned so that said edge portions will threadedly engage said fastening, said bridge portions and body being so constructed and arranged that a member may be inserted therebetween subject to being clamped and held thereby.

HAROLD J. LE VESCONTE.